United States Patent
Wu

(10) Patent No.: US 9,060,342 B2
(45) Date of Patent: Jun. 16, 2015

(54) SYSTEM AND METHOD FOR PASSIVELY DETERMINING OWN POSITION LISTENING TO WIRELESS TIME SYNCHRONIZATION COMMUNICATIONS

(75) Inventor: Ryan Haoyun Wu, Manlius, NY (US)

(73) Assignee: Saab Sensis Corporation, East Syracuse, NY (US)

(*) Notice: Subject to any disclaimer, the term of this patent is extended or adjusted under 35 U.S.C. 154(b) by 575 days.

(21) Appl. No.: 13/438,314

(22) Filed: Apr. 3, 2012

(65) Prior Publication Data

US 2012/0252503 A1 Oct. 4, 2012

Related U.S. Application Data

(60) Provisional application No. 61/471,341, filed on Apr. 4, 2011.

(51) Int. Cl.
*H04W 64/00* (2009.01)
*H04W 56/00* (2009.01)
*G01S 5/10* (2006.01)

(52) U.S. Cl.
CPC .......... *H04W 64/00* (2013.01); *H04W 56/0015* (2013.01); *G01S 5/10* (2013.01); *H04W 56/0055* (2013.01)

(58) Field of Classification Search
USPC ........................................ 342/387; 455/456.1
See application file for complete search history.

(56) References Cited

U.S. PATENT DOCUMENTS

| | | | |
|---|---|---|---|
| 5,890,068 A * | 3/1999 | Fattouche et al. | 455/456.2 |
| 6,249,252 B1 * | 6/2001 | Dupray | 342/450 |
| 7,574,216 B2 * | 8/2009 | Leitch et al. | 455/456.1 |
| 2006/0029009 A1 * | 2/2006 | Alapuranen et al. | 370/310 |
| 2009/0149198 A1 * | 6/2009 | Nam et al. | 455/456.2 |
| 2010/0040090 A1 * | 2/2010 | Lee et al. | 370/503 |
| 2010/0202300 A1 * | 8/2010 | Rhoads et al. | 370/252 |
| 2011/0268097 A1 * | 11/2011 | Agrawala et al. | 370/338 |

FOREIGN PATENT DOCUMENTS

WO    WO 2008073347 A1 *    6/2008 ............... G01S 5/26

OTHER PUBLICATIONS

Eidson, IEEE-1588 Standards for a Precison Clock Synchronization Protocol for Networked Measurement and Control Systems—A Tutorial, Agilent Technologies, Oct. 2005, pp. 1-94.*
Symmetricom: Services and Applications Perspective—Timing and Synchronization in WiMAX Networks, Oct. 2006, pp. 1-6.*

* cited by examiner

*Primary Examiner* — Gregory C Issing
(74) *Attorney, Agent, or Firm* — Burr & Brown, PLLC

(57) ABSTRACT

The system and method of the present invention provides a mobile node (e.g., target), such as an aircraft, vehicle or mobile piece of equipment, the ability to determine its own position by passively listening to wireless time synchronization communications, such as IEEE 1588 Precision Time Protocol (PTP) messages, exchanged between nodes over a wireless network.

22 Claims, 6 Drawing Sheets

SYSTEM AND METHOD FOR PASSIVELY DETERMINING OWN POSITION LISTENING TO WIRELESS TIME SYNCHRONIZATION COMMUNICATIONS

FIELD OF THE INVENTION

The present invention relates to a system and method for determining own position by passively listening to wireless time synchronization messages between multiple nodes in a communications network without transmitting any signals.

BACKGROUND OF THE INVENTION

Several different methods have been used to time synchronize the oscillators or clocks in two or more pieces of equipment that are in communication with one another. For example, a reference transmitter has been used to time synchronize the oscillators or clocks in two or more remote units (RUs) in some existing multilateration systems.

One example of a time synchronization protocol is IEEE 1588, which defines a messaging protocol for synchronizing real-time clocks in the nodes of a distributed networked system. IEEE 1588 describes a hierarchical master-slave clock architecture for time synchronization and clock distribution. In the IEEE 1588 architecture, a time distribution system consists of one or more network segments with one or more clocks in each segment, and each clock is defined as a master clock, a slave clock or a boundary clock.

The IEEE 1588 Precision Time Protocol (PTP) provides a standard message exchange approach that allows a slave clock to be synchronized to a master clock, as shown in FIG. 1. A master clock is selected for each of the network segments in the system and is used as the time synchronization source. A boundary clock is a clock that has multiple network connections and can accurately bridge the time synchronization from one network segment to another network segment. A boundary clock acts as a slave clock in one network segment and a master clock in another network segment. Other clocks in the distributed networked system are slave clocks that are the destination of the time synchronization reference.

IEEE 1588 requires at least one message being sent from the master node to the slave node and one message being sent from the slave to the master for each time synchronization process, as shown in FIG. 1. At the end of one time synchronization process, the slave node has in its possession four pieces of time information, namely time-stamp data for T1, T2', T3', and T4, while the master node has only partial time information, namely time-stamp data for T1 and T4.

Assuming throughout the time synchronization process the distance or propagation delay between the two nodes remains symmetric (i.e. T2−T1=T4−T3) and the clock offset remains constant (i.e. bs does not vary with time), at the end of the time synchronization process the Slave node is able to calculate its clock offset bs and the range R to the master node, based on following equations $$R \equiv \frac{T2-T1}{C} = \frac{T4-T3}{C} \quad (1)$$

$$\Rightarrow R = \frac{[(T2+bs)-T1]+[T4-(T3=bs)]}{2C} = \frac{(T2'-T1)+(T4-T3')}{2C}$$

$$bs = \frac{[(T2+bs)-T1]-[T4-(T3+bs)]}{2} = \frac{(T2'-T1)+(T4-T3')}{2C}$$

where C is the speed of light.

Most systems for determining own position require the transmission and receipt of dedicated signals for position determination. With the density of transmitted signals being transmitted, what is needed is a system and method that enables a mobile node to determine its own position without transmitting any signals by passively listening to wireless time synchronization communications, such as IEEE 1588, between a plurality of wireless transceivers.

SUMMARY OF THE INVENTION

According to a first aspect of the present invention there is provided a method of enabling a receiver to passively determine its own position by receiving wireless messages within a wireless network, the method comprising transmitting and receiving a plurality of messages between at least two pairs of nodes of known position within the wireless network, transmitting at least a transmit time of one of the messages and a receive time of another of the messages transmitted between the at least two nodes from one node of each pair of the at least two pairs of nodes, passively receiving and decoding the plurality of messages transmitted between the at least two pairs of nodes at the receiver, and determining own position for the receiver from (i) the known positions of the at least two pairs of nodes, (ii) reception time at the receiver of each of the plurality of messages transmitted between the at least two pairs of nodes, and (iii) the transmit time of one of the messages and the receive time of another of the messages transmitted by the one node of each pair of the at least two pairs of nodes.

In one embodiment, the method further comprises periodically updating the locations of the each node of the at least two pairs of nodes via the wireless network.

According to a second aspect of the present invention there is provided a method of enabling a receiver to passively determine its own position by receiving wireless messages between transceivers, the method comprising transmitting a first message from a first transceiver of known position, receiving the first message at a second transceiver of known position and transmitting a second message from the second transceiver, receiving the second message at the first transceiver and transmitting a transmit time of the first message and a receive time of the second message from the first transceiver to the second transceiver, transmitting a third message from a third transceiver of known position, receiving the third message at a fourth transceiver of known position and transmitting a fourth message from the fourth transceiver, receiving the fourth message at the third transceiver and transmitting a transmit time of the third message and a receive time of the fourth message from the third transceiver to the fourth transceiver, passively receiving and decoding at the receiver (i) the first, second, third and fourth messages, (ii) the transmit time of the first message and the receive time of the second message transmitted to the second transceiver, and (iii) the transmit time of the third message and the receive time of the fourth message transmitted to the fourth transceiver, and determining own position for the receiver from (i) the known positions of the first, second, third and fourth transceivers, (ii) reception times of the first, second, third and fourth messages at the receiver, (iii) the transmit time of the first message and the receive time of the second message transmitted to the second transceiver, and (iv) the transmit time of the third message and the receive time of the fourth message transmitted to the fourth transceiver.

In one embodiment, the method further comprises periodically updating the locations of the each node of the at least two pairs of nodes via the wireless network.

According to a third aspect of the present invention there is provided a system for enabling a receiver to passively determine its own position by receiving wireless messages within a wireless network, the system comprising at least two pairs of nodes of known position within the wireless network, each pair of nodes transmitting and receiving a plurality of messages between each other, wherein one node of each pair of the at least two pairs of nodes transmits at least a transmit time of one of the messages and a receive time of another of the messages transmitted between the at least two nodes, and wherein the receiver passively receives and decodes the plurality of messages transmitted between the at least two pairs of nodes and determines own position for the receiver from (i) the known positions of the at least two pairs of nodes, (ii) reception time at the receiver of each of the plurality of messages transmitted between the at least two pairs of nodes, and (iii) the transmit time of one of the messages and the receive time of another of the messages transmitted by the one node of each pair of the at least two pairs of nodes.

In one embodiment, the plurality of messages are IEEE 1588 wireless messages. In another embodiment, the at least two pairs of nodes comprises a master node and at least two slave nodes and the locations of the master node and the at least two slave nodes are periodically updated via the wireless network.

In one embodiment, the mobile receiver determines a TDOA between a first pair of nodes of the at least two pairs of nodes, determines a TDOA between a second pair of nodes in which at least one of the nodes of the second pair of nodes is a different node than the first pair of nodes, tracks TDOAs determined between the first pair of nodes and TDOAs determined between the second pair of nodes at the mobile receiver, and determines its own position by TDOA multilateration processing using at least the tracked TDOAs and known positions of the first pair and the second pair of nodes.

According to a fourth aspect of the present invention there is provided a system for enabling a receiver to passively determine its own position by receiving wireless messages between transceivers on a wireless network, the system comprising a first transceiver of known position transmitting a first message, a second transceiver of known position receiving the first message and transmitting a second message, a third transceiver of known position transmitting a third message, and a fourth transceiver of known position receiving the third message and transmitting a fourth message, wherein the first transceiver receives the second message and transmits a transmit time of the first message and a receive time of the second message to the second transceiver, the third transceiver receives the fourth message and transmits a transmit time of the third message and a receive time of the fourth message to the fourth transceiver, the receiver passively receives and decodes (i) the first, second, third and fourth messages, (ii) the transmit time of the first message and the receive time of the second message transmitted to the second transceiver, and (iii) the transmit time of the third message and the receive time of the fourth message transmitted to the fourth transceiver, and the receiver determines own position for the receiver from (i) the known positions of the first, second, third and fourth transceivers, (ii) reception times of the first, second, third and fourth messages at the receiver, (iii) the transmit time of the first message and the receive time of the second message transmitted to the second transceiver, and (iv) the transmit time of the third message and the receive time of the fourth message transmitted to the fourth transceiver.

In one embodiment, the plurality of messages are IEEE 1588 wireless messages. In another embodiment, the first through fourth transceivers comprises at least one master node and at least two slave nodes and the locations of the at least one master node and the at least two slave nodes are periodically updated via the wireless network. In some embodiments, at least one of the first through fourth transceivers is a boundary node.

In one embodiment, the mobile receiver determines a TDOA between the first and second transceivers, determines a TDOA between the third and fourth transceivers, tracks the TDOAs determined between the first and second transceivers and the TDOAs determined between the third and fourth transceivers at the receiver, and determines its own position by TDOA multilateration processing using at least the tracked TDOAs and known positions of the first, second, third and fourth transceivers.

In one embodiment, Kalman filtering tracks the TDOAs and the determining of its own position by TDOA multilateration processing inhterpolates the Kalman Filter tracked TDOAs to a predetermined point in time. In another embodiment, the TDOA multilateration processing uses a Maximum Likelihood Estimation approach.

In another embodiment, the mobile receiver determines TDOAs between the master node and each of the at least two slave nodes using the following equations (referring to FIG. 4):

$$TDOA = \frac{(R_{me} - R_{se})}{C} \quad (2)$$
$$= [T5 + b_e - T1] - [T6 + b_e - T3]$$
$$= [T5' - T1] - \left[T6' - T4 + \frac{R_{ms}}{C}\right]$$

where:
T1=transmission time of first message at the master node based on master node's clock,
T3=transmission time of second message at the slave node based on master node's clock,
T4=time of receipt of second message at the master node based on master node's clock,
T5'=time of receipt of first message at the mobile receiver using the mobile receiver's local clock, where T5'=T5+$b_e$,
T5=corrected time of receipt of first message at mobile receiver using master node's clock,
$b_e$=mobile receiver's clock offset from master node's clock,
T6'=time of receipt of second message at the mobile receiver using mobile receiver's local clock, where T6'=T6+$b_e$,
T6=corrected time of receipt of second message at mobile receiver using master node's clock,
$R_{me}$=distance between the master node and the mobile receiver,
$R_{se}$=distance between the one of the at least two slave nodes and the mobile receiver,
$R_{ms}$=the known distance between the master node and the one of the slave nodes, and
C=speed of light, and
determines its own position by determining an intersection of the at least two determined TDOAs.

In one embodiment, the mobile receiver is a slave node on the wireless network that includes at least the first and second transceivers of the first through fourth transceivers, and synchronizes its clock with clocks of at least the first and second transceivers, wherein when a clock offset, $b_e$, for the mobile receiver's clock is known, the mobile receiver determines its own position from (i) the known positions of at least the first and second transceivers of the first through fourth transceivers, (ii) reception times of at least the first and second messages of the first through fourth messages at the mobile receiver, (iii) the transmit time of at least the first message, (iv) the receive time of at least the second message, and (v) the clock offset $b_e$.

In another embodiment, the mobile receiver determines its own position by solving an intersection of the at least one TDOA that is tracked to a predetermined point in time and the at least one range that is tracked to the same predetermined point in time, wherein the at least one TDOA is calculated using (i) the known positions of at least the first and second transceivers of the first through fourth transceivers, (ii) reception times of at least the first and second messages of the first through fourth messages at the mobile receiver, (iii) the transmit time of at least the first message, (iv) the receive time of at least the second message; and the at least one range is calculated using (i) the known positions of at least the first and second transceivers of the first through fourth transceivers, (ii) reception times of at least the first and second messages of the first through fourth messages at the mobile receiver, (iii) the transmit time of at least the first message, (iv) the receive time of at least the second message, and (v) the clock offset $b_e$. In some of these embodiments, Kalman filtering tracks the at least one TDOA and the at least one range and the at least one TDOA and the at least one rage are interpolated to a predetermined point in time. In other embodiments, the position determination using the at least one tracked TDOA and the at least one tracked range uses a Maximum Likelihood Estimation approach.

In some embodiments, at least one of the first through fourth transceivers is part of a unmanned aerial system (UAS). In other embodiments, the mobile receiver is part of a unmanned aerial system (UAS).

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

Figure 1:
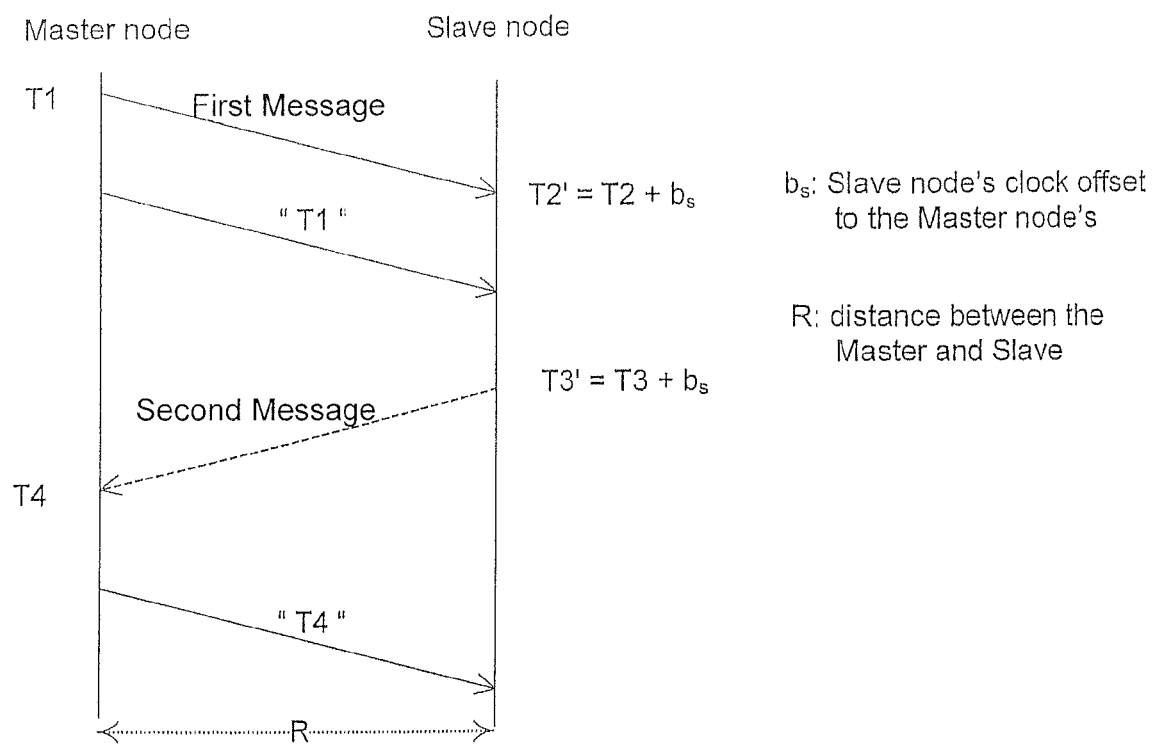
FIG. 1 shows an example of existing IEEE 1588 Precision Time Protocol (PTP) message protocol (Prior Art)
Figure 2:
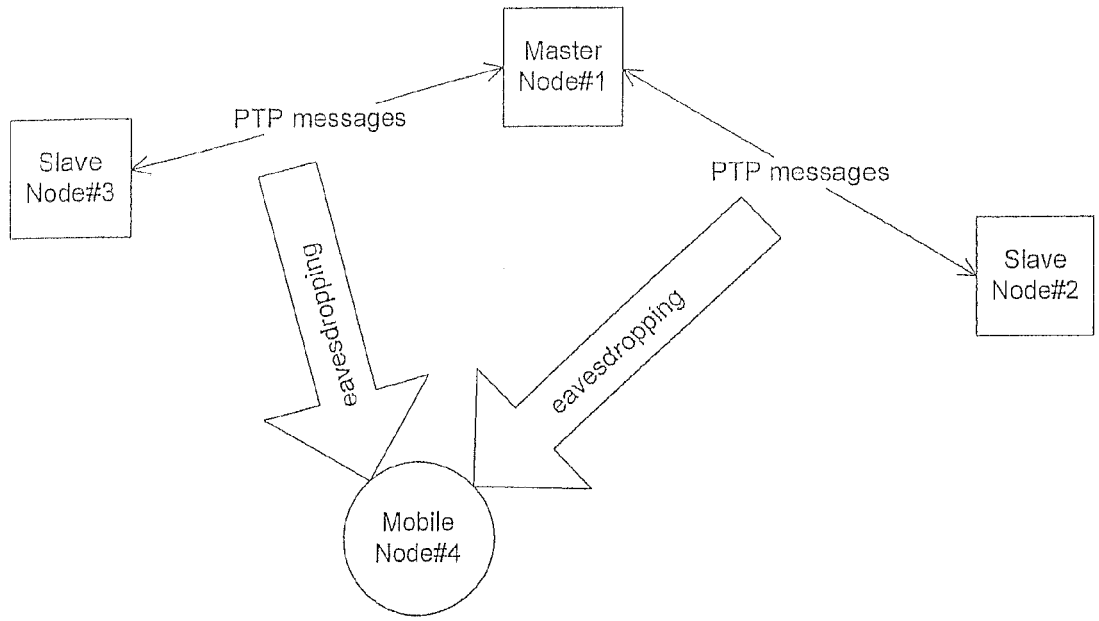
FIG. 2 illustrates an example of a mobile node (e.g., target) that is not time synchronized with the communicating nodes passively determining its own position by listening to wireless time synchronization communications between two pairs of master-slave nodes in one embodiment of the present invention.

The system and method of the present invention provides a mobile receiver or node, such as an aircraft, unmanned aerial system (UAS), vehicle or mobile piece of equipment, the ability to determine its own position by passively listening to wireless time synchronization communications exchanged between a plurality of nodes over a wireless network, as shown in FIG. 2. The wireless time synchronization communications can be of any time synchronization format, including IEEE 1588 Precision Time Protocol (PTP), which communicates sufficient time information (e.g., time stamp data) in the transmitted messages to enable the receiver to determine its own position.

When the mobile receiver passively receives (i.e., eavesdrops) on the time synchronization communications exchanged between two pairs of wireless transceivers at known locations (e.g., a master node and two slave nodes of a PTP network), as shown in FIG. 2, the mobile receiver determines a time difference of arrival (TDOA) for each pair of wireless transceivers, when the mobile receiver is not time synchronized to the wireless transceivers, and determines its own position using the determined TDOAs for each pair of wireless transmitters. The mobile node calculated TDOA times the speed of light defines a hyperboloid upon which the mobile node lies. The foci of the hyperboloid are located at the known positions of the master node and the slave node.

In one embodiment, The mobile node determines its own position (e.g., two-dimensional position) using the known positions of each of the wireless transceivers, the reception time of each of the messages transmitted between each pair of wireless transmitters and the message time stamp data contained in the messages. In another embodiment, the mobile receiver determines its own altitude from another on-board sensor and uses the determined TDOAs and altitude data to determine a three-dimensional position of itself.

Figure 3:
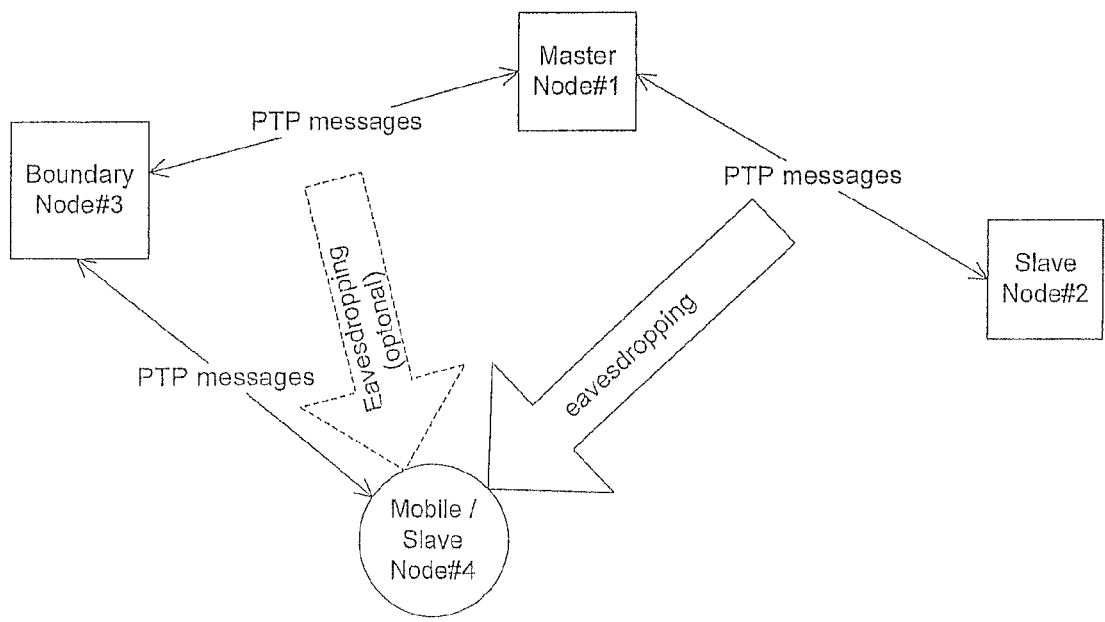
FIG. 3 illustrates an example of a mobile node (e.g., target) that is time synchronized with the communicating nodes passively determining its own position by listening to wireless time synchronization communications between one pair of master-slave nodes in one embodiment of the present invention.

If the mobile receiver is time synchronized to the wireless transceivers (i.e. the mobile node is either a slave node or a boundary node of the PTP network) that are exchanging the wireless time synchronization communications, then only one pair of wireless transceivers at known locations are required for the mobile node to determine its own position, as shown in FIG. 3.

Figure 4:
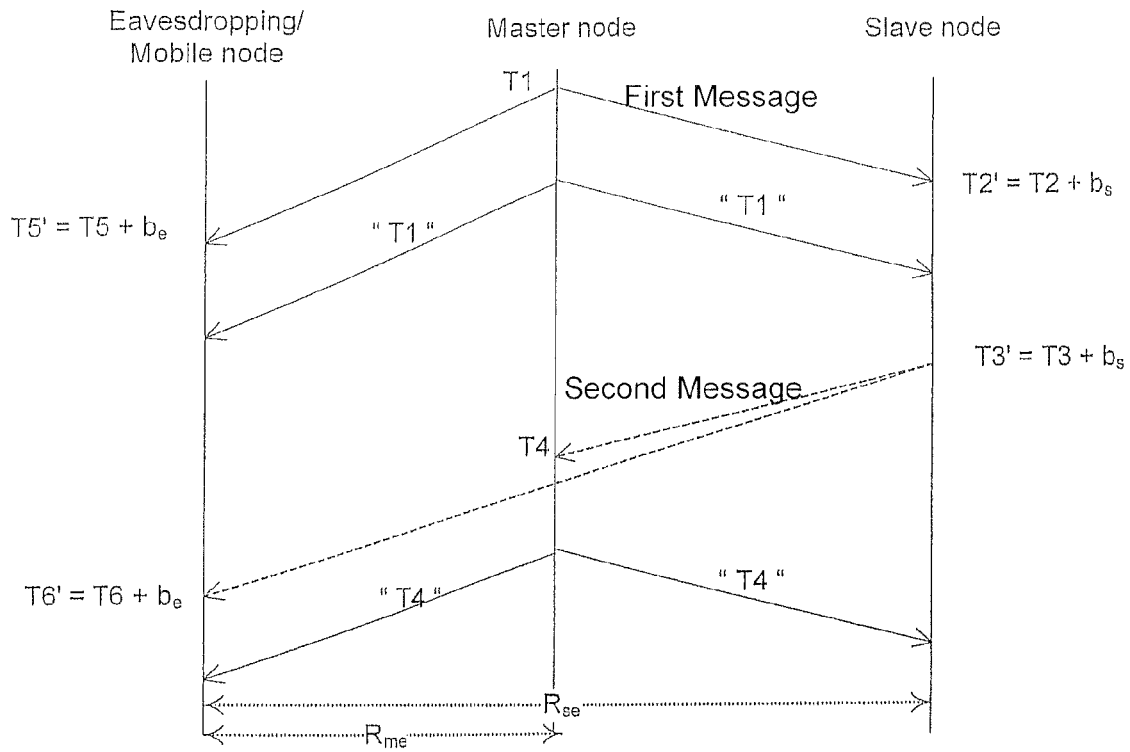
FIG. 4 illustrates an example of a mobile node (e.g., target) passively listening (eavesdropping) on wireless time synchronization communications between one pair of master-slave nodes to determine a TDOA for the mobile node in one embodiment of the present invention.

For example, a system and method for a mobile node to determine a time difference of arrival (TDOA) hyperboloid for a pair of wireless transceivers exchanging IEEE1588 PTP messages is shown in FIG. 4. In FIG. 4, an eavesdropping mobile node receives typical IEEE 1588 wireless time synchronization messages transmitted between the master node and the slave node. At the end of the time synchronization process, the slave node and the eavesdropping mobile node are provided with T1 and T4 time information by the master node. The slave node can determine its clock offset, $b_s$, and range to the master node using equation (1).

In one embodiment, a first transceiver of known position transmits a first message, which is received by a second transceiver of known position and the second transceiver transmits a second message that is received by the first transceiver. The first transceiver transmits a transmit time of the first message and a receive time of the second message to the second transceiver. Similarly, a third transceiver of known position transmits a third message, which is received by a fourth transceiver of known position and the fourth transceiver transmits a fourth message that is received by from the third transceiver. The third transceiver transmits a transmit time of the third message and a receive time of the fourth message to the fourth transceiver. The mobile receiver passively receives and decodes each of the first, second, third and fourth messages, the transmit time of the first message and the receive time of the second message transmitted to the second transceiver, and the transmit time of the third message and the receive time of the fourth message transmitted to the fourth transceiver. In this embodiment, the mobile receiver then determines its own position from (i) the known positions of the first, second, third and fourth transceivers, (ii) reception times of the first, second, third and fourth messages at the mobile receiver, (iii) the transmit time of the first message and the receive time of the second message transmitted to the second transceiver, and (iv) the transmit time of the third message and the receive time of the fourth message transmitted to the fourth transceiver. It should be understood by any person who is skilled in the art that the transmit time of the first message and the receive time of the second message transmitted to the second transceiver can be transmitted by the first transceiver in separate messages as illustrated in FIG. 2, or can be transmitted in a single message which contains all of the information. Similarly the transmit time of the third message and the receive time of the fourth message transmitted to the fourth transceiver can be transmitted by the third transceiver in separate messages or can be transmitted in a single message which contains all of the information.

In another embodiment, at least one wireless transceiver distributes its time to the other wireless transceivers of the plurality of wireless transceivers and the mobile receiver to synchronize the plurality of wireless transceivers and the mobile receiver to a common time base, the mobile receiver receives, decodes and time-stamps the time synchronization messages exchanged between a plurality of wireless transceivers and a mobile receiver, determines and tracks a local clock offset of the mobile receiver and a range to a wireless transceiver having one of a master clock and a boundary clock, determines at least one TDOA to a pair of wireless transceivers and tracks the at least one TDOA determined to the pair of wireless transceivers, determines own position by range-and-TDOA-based multilateration processing using the at least one TDOA determined to the pair of wireless transceivers, a known position of each wireless transceiver of the pair of wireless transceivers and the determined range to a known position of the wireless transceiver comprising one of the master clock and the boundary clock, and tracks a plurality of determined own positions of the mobile receiver for navigating the mobile receiver.

In some embodiments, the system and method of the present invention includes one or more TDOA trackers that takes the determined TDOAs for one or more pairs of wireless transmitters as inputs, stores and tracks the determined TDOAs, thereby enabling the mobile receiver to calculate its own position based on interpolated or extrapolated TDOAs based on the tracked TDOAs. The trackers are used to remove any discrepancies in the TDOAs as the result of the asynchronous nature of TDOA measurements and the movement of the mobile receiver between the instances of distinct TDOA measurements. The mobile receiver position at a predetermined time is the position determined based on the interpolation or extrapolation of TDOAs to the predetermined point in time. In some embodiments, the tracking technique of the tracker uses Kalman filtering for interpolation or extrapolation of the TDOA data. TDOA tracking enable position determination to be performed at a common time point, or in a synchronous fashion.

If the positions of the master node and slave node are known to the mobile node, the distance between the master node and slave node is also known to the mobile node, and a TDOA for the mobile node is derived, using the following equations (referring to FIG. 4):

$$TDOA = \frac{(R_{me} - R_{se})}{C} \qquad (2)$$
$$= [T5 + b_e - T1] - [T6 + b_e - T3]$$
$$= [T5' - T1] - \left[T6' - T4 + \frac{R_{ms}}{C}\right]$$

where:
T1=transmission time of first message at the master node based on master node's clock,
T3=transmission time of second message at the slave node based on master node's clock,
T4=time of receipt of second message at the master node based on master node's clock,
$R_{me}$=distance between the master node and the mobile node,
$R_{se}$=distance between the slave node and the mobile node,
$R_{ms}$=the known distance between the master node and a slave node,
T5'=time of receipt of start request message at the eavesdropping mobile node using mobile node's local clock, where T5'=T5+$b_e$,
T5=corrected time of receipt of start request message at eavesdropping mobile node using master node's clock,
$b_e$=eavesdropping mobile node's clock offset from master node's clock,
T6'=time of receipt of start reply message at the eavesdropping mobile node using mobile node's local clock, where T6'=T6+$b_e$, and
T6=corrected time of receipt of start reply message at eavesdropping mobile node using master node's clock.

Figure 6:
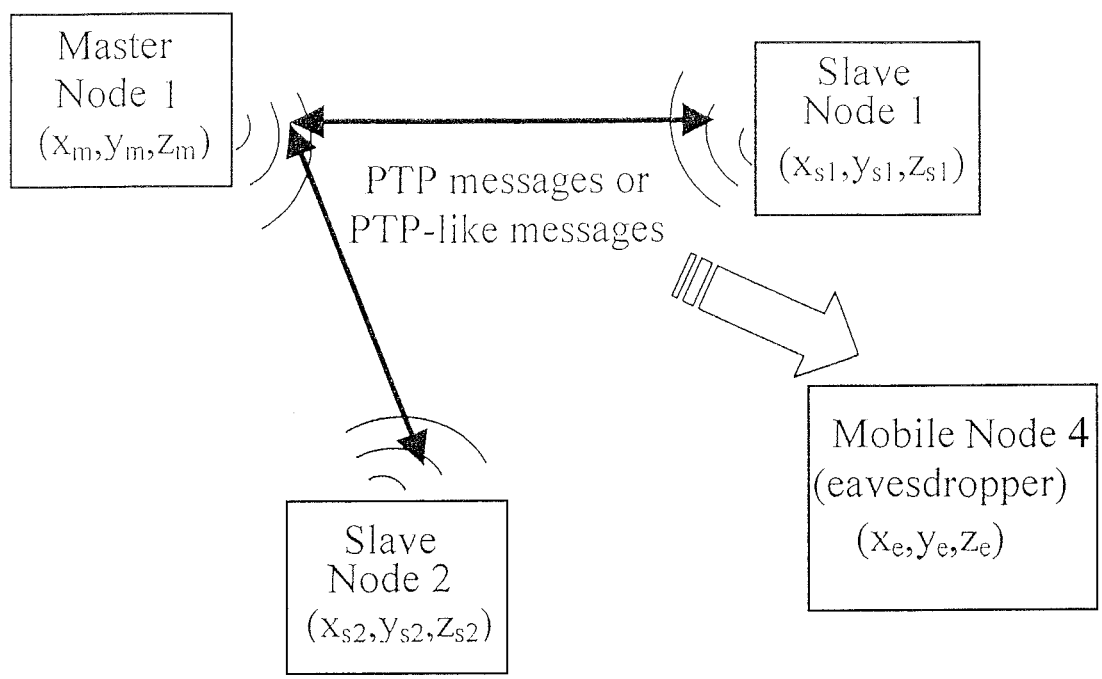
FIG. 6 illustrates an example of a unmanned aerial system (UAS) mobile node passively listening (eavesdropping) on wireless time synchronization communications between two pairs of UAS master-slave nodes to determine two TDOAs for the mobile node in one embodiment of the present invention.

As previously stated, the calculated TDOA times the speed of light defines a hyperboloid upon which the mobile node lies and the foci of the hyperboloid are located at the known locations of the master node and the slave node. For example, referring to FIG. 6, where there are two pairs of master-slave nodes providing the two TDOAs. Of the two pairs there is a common master node such that only three time synchronized nodes or transceivers are needed. The position of the common master node, $(x_m, y_m, z_m)$, is known to the mobile node, which is located at $(x_e, y_e, z_e)$, which is unknown to itself, and the positions of the two slave nodes, $(x_{s1}, y_{s1}, z_{s1})$ and $(x_{s2}, y_{s2}, z_{s2})$ are made known to the mobile node as well. It is common that the mobile or eavesdropping node has a barometric altitude sensor such that the altitude and the vertical position, $z_e$, are known and only the horizontal position, $(x_e, y_e)$, needs to be solved. Using the TDOA information, the following equations can be formed $$TDOA_1 - \sqrt{(x_e-x_m)^2+(y_e-y_m)^2+(z_e-z_m)^2} - \sqrt{(x_e-x_{s1})^2+(y_e-y_{s1})^2+(z_e-z_{s1})^2} = n_1$$

$$TDOA_2 - \sqrt{(x_e-x_m)^2+(y_e-y_m)^2+(z_e-z_m)^2} - \sqrt{(x_e-x_{s2})^2+(y_e-y_{s2})^2+(z_e-z_{s2})^2} = n_2$$

where $n_1$ and $n_2$ are the measurement error or noise of the obtained $TDOA_1$ and $TDOA_2$ from the master node and the slave node 1 and slave node 2, respectively. Let e be a column vector containing elements of $n_1$ and assuming the errors $n_1$ and $n_2$ are zero-mean Gaussian random variables, the horizontal position of the mobile node, $(x_e, y_e)$, can be solved using Maximum Likelihood Estimation approach by minimizing a cost C which is a function of $(x_e, y_e)$. The solution of $(x_e, y_e)$ is the $(x_e, y_e)$ that minimizes C where $$C = e^T W e$$

$$e = \begin{bmatrix} n_1 \\ n_2 \end{bmatrix}, e^T = [n_1 \; n_2]$$

and W is the inverse of the covariance matrix of e. In some embodiments the TDOAs are first tracked via Kalman Filtering techniques and the TDOAs are interpolated or extrapolated to a common point in time for use in the Maximum Likelihood Estimation process to compute the solution of $(x_e, y_e)$.

Note that the positions of the master node and slave nodes are assumed to be exactly known such that the distance between any two nodes is exactly known. In one embodiment of the present invention, a database is maintained locally at the mobile node and is updated periodically with the latest position data over the wireless network.

Figure 5:
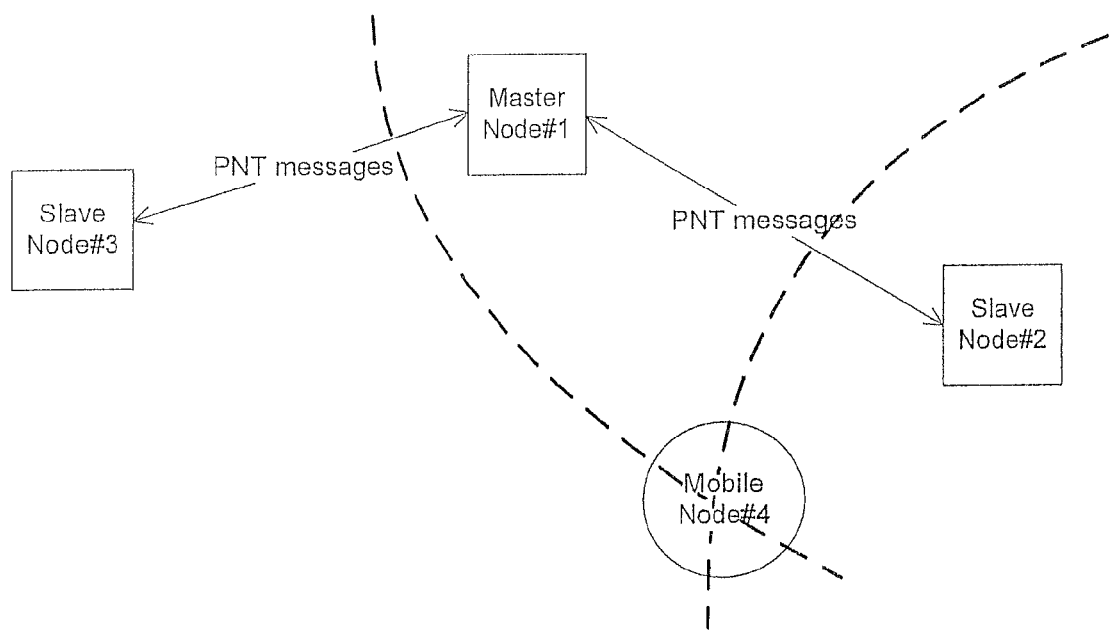
FIG. 5 illustrates an example of a mobile node (e.g., target) determining its own position by intersecting TDOA hyperbolas in one embodiment of the present invention.

When the mobile node observes message exchanges between a master node and two or more slave nodes, the mobile node determines two or more TDOAs, and the mobile node estimates its own position by solving for the intersection of the two or more TDOA hyperbolas (or hyperboloids in three-dimensions (3-D)), as shown in FIG. 5. The position of the master node and the slave node need to be known to the mobile node in order for the mobile node to solve for its own position.

A boundary node is a node that has multiple network connections and can accurately bridge the time synchronization from one network segment to another network segment. A boundary node can act as a slave node in one network segment and a master node in another network segment. A boundary node can be substituted into the disclosed equations as either a slave node or a master node, depending on its function within the network.

The system and method of the present invention does not exclude the cases where the mobile node is an active part of the time synchronization message exchange nodes. For example, the mobile node can be time synchronized to the clock of the master node or a boundary node in the time synchronization network such that the mobile node clock offset, $b_e$, is known. In this case values of $R_{me}$ and $R_{se}$ of Equation (2) are determined independently using the following equations (referring to FIG. 4):

$$R_{me} = (T5' - T1 - b_e)C, \text{ and}$$

$$R_{se} = (T6' - T3 - b_e)C$$

where:
T1=transmission time of first message at the master node based on master node's clock,
T3=transmission time of second message at the slave node based on master node's clock,
T5'=corrected time of receipt of first message at the mobile receiver using mobile receiver's local clock, where $T5' = T5 + b_e$,
T6'=time of receipt of second message at the mobile receiver using the mobile receiver's local clock, where $T6' = T6 + b_e$,
$R_{me}$=distance between the master node and the mobile node,
$R_{se}$=distance between a slave node and the mobile node, and
C=speed of light.

The mobile node can then determine its own horizontal (two-dimensional (2-D)) position by intersecting the arcs of the two determined ranges from the nodes of known positions using range-based positioning techniques. This is equivalent to determining first the range to the master node ($R_{me}$) and second determining the TDOA to the master and slave node, as done in the prior approach, because the range to slave node ($R_{se}$) can be derived from the TDOA and the range to master node. Alternatively, the mobile node can determine its own horizontal (two-dimensional (2-D)) position by intersecting the arcs of the determined range to master node or slave node of known position and the TDOA from the master and slave nodes of known positions using range-and-TDOA-based positioning techniques. Additional TDOAs or ranges to slave nodes can also be used for solving mobile node position, whenever they are available. Note that only one range is determined directly as the result from communicating directly to a master or boundary node and any additional TDOA or range information is obtained from eavesdropping or passively receiving communications between the nodes of the time synchronization network. In the above cases case, the determination of position is done based on the following information: (i) the known positions of at least the first and second transceivers of the first through fourth transceivers, (ii) reception times of at least the first and second messages of the first through fourth messages at the mobile receiver, (iii) the transmit time of at least the first message, (iv) the receive time of at least the second message, and (v) the clock offset $b_e$.

Figure 7:
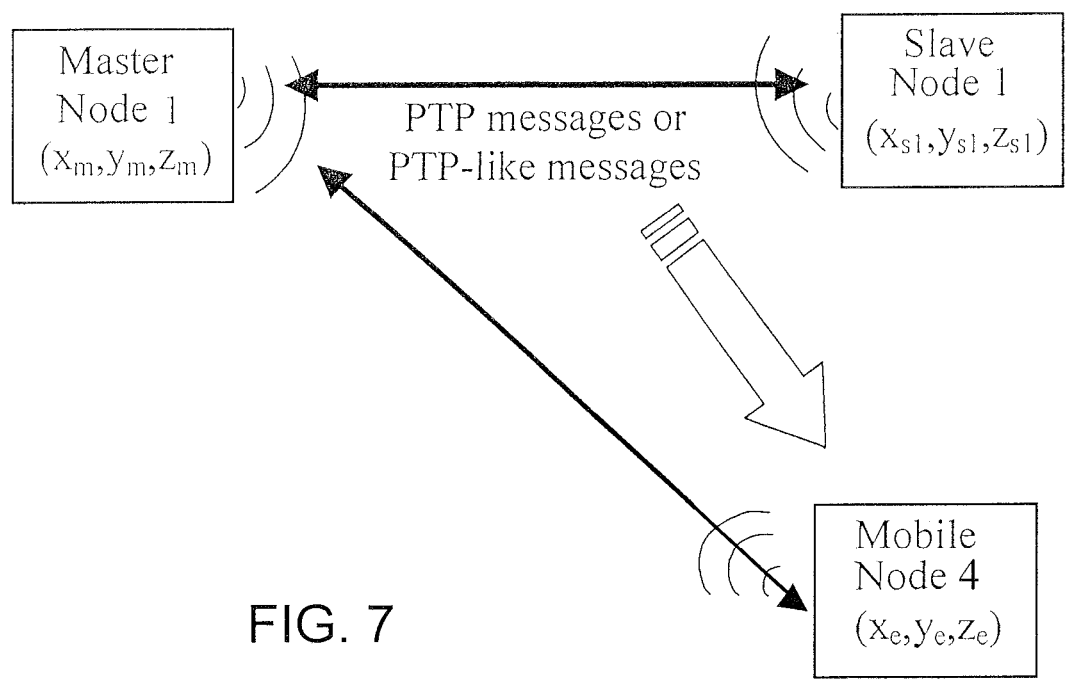
FIG. 7 illustrates an example of a UAS mobile node passively listening (eavesdropping) on wireless time synchronization communications between a pair of UAS master-slave nodes to determine one TDOA and actively synchronizing itself to the master node to determine one range in one embodiment of the present invention.

In some embodiments, the range-and-TDOA based positioning is done using a Maximum Likelihood Estimator approach. For example, referring to FIG. 7, where there is a common master node between the slave node and the mobile node, and the master node provides one TDOA (i.e. $TDOA_1$) and one range (i.e. $R_{me}$) measurement The position of the common master node, $(x_m, y_m, z_m)$, is known to the mobile node, which is located at $(x_e, y_e, z_e)$, which is unknown to itself, and the position of the slave node 1, $(x_{s1}, y_{s1}, z_{s1})$ is known to the mobile node as well. It is common that the mobile node has a barometric altitude sensor such that the altitude and the vertical position, $z_e$, are known and only the horizontal position, $(x_e, y_e)$, needs to be solved. Using the TDOA and range information, the following equations can be formed $$TDOA_1 - \sqrt{(x_e-x_m)^2+(y_e-y_m)^2+(z_e-z_m)^2} - \sqrt{(x_e-x_{s1})^2+(y_e-y_{s1})^2+(z_e-z_{s1})^2} = n_1$$

$$R_{me} - \sqrt{(x_e-x_m)^2+(y_e-y_m)^2+(z_e-z_m)^2} = n_{me}$$

where $n_1$ and $n_{me}$ are the measurement error or noise of the obtained $TDOA_1$ and $R_{me}$ respectively. Let e be a column vector containing elements of $n_1$ and $n_{me}$, assuming the errors $n_1$ and $n_{me}$ are zero-mean Gaussian random variables, the horizontal position of the mobile node, $(x_e, y_e)$, can be solved using a Maximum Likelihood Estimation approach by minimizing a cost C which is a function of $(x_e, y_e)$. The solution of $(x_e, y_e)$ is the $(x_e, y_e)$ that minimizes C where $$C = e^T W e$$

$$e = \begin{bmatrix} n_1 \\ n_{me} \end{bmatrix}, \quad e^T = [n_1 \ n_{me}]$$

and W is the inverse of the covariance matrix of e. In some embodiments the measurements of TDOA and range are first tracked via Kalman Filtering techniques and the TDOA and range are interpolated or extrapolated to a predetermined point in time for use in the Maximum Likelihood Estimation process to compute the solution of $(x_e, y_e)$.

Note that when the mobile node is synchronized to the master node and the mobile node clock offset is estimated, the range to the master node and range to the slave node measurements can be estimated independently of the TDOA measurement. Because they are independent observations, even though their formulations are linearly dependent, one can use all three measurements to solve for the mobile node position. The result will be more accurate then not using all of them. The effect can be seen as the noise reduction effect by averaging over redundant observations.

While the present invention has been particularly shown and described with reference to the preferred mode as illustrated in the drawings, it will be understood by one skilled in the art that various changes in detail may be effected therein without departing from the spirit and scope of the invention as defined by the claims.

The invention claimed is:

1. A method of enabling a receiver including processor to passively determine its own position by receiving wireless messages within a wireless network, the method comprising:
   transmitting and receiving a plurality of messages between at least two pairs of nodes of known position within the wireless network;
   one node of each pair of nodes transmitting at least a transmit time of a first message transmitted by the one node and another message including a receive time at the one node of a reply message transmitted by the other node of the pair of nodes in response to the first message;
   passively receiving and decoding the plurality of messages transmitted between the at least two pairs of nodes at said receiver; and
   determining own position by said processor for said receiver from (i) the known positions of the at least two pairs of nodes, (ii) reception time at said receiver of each of the plurality of messages transmitted between the at least two pairs of nodes, and (iii) the transmit time of the first message and the receive time of the reply message at the one node transmitted by the one node to the other node of each pair of the at least two pairs of nodes.

2. The method of claim 1, further comprising periodically updating the locations of the each node of the at least two pairs of nodes via the wireless network.

3. A method for enabling a receiver including a processor to passively determine its own position by receiving wireless messages between transceivers, the method comprising:
   transmitting a first message from a first transceiver of known position;
   receiving the first message at a second transceiver of known position and transmitting a second message from the second transceiver;
   receiving the second message at the first transceiver and transmitting a transmit time of the first message and a receive time of the second message from the first transceiver to the second transceiver;
   transmitting a third message from a third transceiver of known position;
   receiving the third message at a fourth transceiver of known position and transmitting a fourth message from the fourth transceiver;
   receiving the fourth message at the third transceiver and transmitting a transmit time of the third message and a receive time of the fourth message from the third transceiver to the fourth transceiver;
   passively receiving and decoding at said receiver (i) the first, second, third and fourth messages, (ii) the transmit time of the first message and the receive time of the second message transmitted to the second transceiver, and (iii) the transmit time of the third message and the receive time of the fourth message transmitted to the fourth transceiver; and
   determining own position by aid processor for said receiver from (i) the known positions of the first, second, third and fourth transceivers, (ii) reception times of the first, second, third and fourth messages at said receiver, (iii) the transmit time of the first message and the receive time of the second message transmitted to the second transceiver, and (iv) the transmit time of the third message and the receive time of the fourth message transmitted to the fourth transceiver.

4. The method of claim 3, further comprising periodically updating the locations of the first through fourth transceivers via the wireless network.

5. A system for enabling a receiver including a processor to passively determine its own position by receiving wireless messages within a wireless network, the system comprising:
   at least two pairs of nodes of known position within the wireless network, each pair of nodes transmitting and receiving a plurality of messages between each other,
   wherein one node of each pair of the at least two pairs of nodes transmits at least a transmit time of a first message transmitted by the one node to the other node of the pair of nodes and a receive time of a reply message at the one node transmitted by the one node in another message transmitted between the at least two nodes, and
   wherein said receiver passively receives and decodes the plurality of messages transmitted between the at least two pairs of nodes and said processor determines own position for said receiver from (i) the known positions of the at least two pairs of nodes, (ii) reception time at said receiver of each of the plurality of messages transmitted between the at least two pairs of nodes, and (iii) the transmit time of the first message and the receive time of reply message at the one node transmitted by the one node to the other node of each pair of the at least two pairs of nodes.

6. The system of claim 5, wherein the plurality of messages are IEEE 1588 wireless messages.

7. The system of claim 6, wherein the at least two pairs of nodes comprises at least one master node and at least two slave nodes and the locations of the at least one master node and the at least two slave nodes are periodically updated via the wireless network.

8. The system of claim 6, wherein said processor
   determines a TDOA between a first pair of nodes of the at least two pairs of nodes,
   determines a TDOA between a second pair of nodes in which at least one of the nodes of the second pair of nodes is a different node than the first pair of nodes,
   tracks TDOAs determined between the first pair of nodes and TDOAs determined between the second pair of nodes at said receiver, and determines its own position by TDOA multilateration processing using at least the tracked TDOAs and known positions of the first pair and the second pair of nodes.

9. A system for enabling a receiver including a processor to passively determine its own position by receiving wireless messages between transceivers on a wireless network, the system comprising:
a first transceiver of known position transmitting a first message;
a second transceiver of known position receiving the first message and transmitting a second message;
a third transceiver of known position transmitting a third message; and
a fourth transceiver of known position receiving the third message and transmitting a fourth message,
wherein the first transceiver receives the second message and transmits a transmit time of the first message and a receive time of the second message to the second transceiver,
wherein the third transceiver receives the fourth message and transmits a transmit time of the third message and a receive time of the fourth message to the fourth transceiver,
wherein said processor passively receives and decodes (i) the first, second, third and fourth messages, (ii) the transmit time of the first message and the receive time of the second message transmitted to the second transceiver, and (iii) the transmit time of the third message and the receive time of the fourth message transmitted to the fourth transceiver, and
wherein said receiver determines own position for said receiver from (i) the known positions of the first, second, third and fourth transceivers, (ii) reception times of the first, second, third and fourth messages at said receiver, (iii) the transmit time of the first message and the receive time of the second message transmitted to the second transceiver, and (iv) the transmit time of the third message and the receive time of the fourth message transmitted to the fourth transceiver.

10. The system of claim 9, wherein the plurality of messages are IEEE 1588 wireless messages.

11. The system of claim 10, wherein the first through fourth transceivers comprises at least one master node and at least two slave nodes and the locations of the at least one master node and the at least two slave nodes are periodically updated via the wireless network.

12. The system of claim 11, wherein at least one of said first through fourth transceivers is a boundary node.

13. The system of claim 11, wherein said processor
determines a TDOA between the first and second transceivers,
determines a TDOA between the third and fourth transceivers,
tracks the TDOAs determined between the first and second transceivers and the TDOAs determined between the third and fourth transceivers at the receiver, and
determines its own position by TDOA multilateration processing using at least the tracked TDOAs and known positions of the first, second, third and fourth transceivers.

14. The system of claim 13, wherein Kalman filtering tracks the TDOAs and the determining of its own position by TDOA multilateration processing interpolates the Kalman filter tracked TDOAs to a predetermined point in time.

15. The system of claim 13, wherein the TDOA multilateration processing uses a Maximum Likelihood Estimation approach.

16. The system of claim 11, wherein said processor determines TDOAs between the master node and each of the at least two slave nodes using the following equations:

$$TDOA = \frac{(R_{me} - R_{se})}{C} \quad (2)$$
$$= [T5 + b_e - T1] - [T6 + b_e - T3]$$
$$= [T5' - T1] - \left[T6' - T4 + \frac{R_{ms}}{C}\right]$$

where:
T1=transmission time of a first message at a master node based on master node's clock,
T3=transmission time of second message at a slave node based on master node's clock,
T4=time of receipt of second message at the master node based on the master node's clock,
T5'=time of receipt of first message at the receiver using the receiver's local clock, where $T5'=T5+b_e$,
T5=corrected time of receipt of first message at the receiver using master node's clock,
$b_e$=the receiver's clock offset from master node's clock,
T6'=time of receipt of second message at the receiver using receiver's local clock, where $T6'=T6+b_e$,
T6=corrected time of receipt of second message at the receiver using master node's clock,
$R_{me}$=distance between the master node and the receiver,
$R_{se}$=distance between the one of the at least two slave nodes and the receiver,
$R_{ms}$=the known distance between the master node and the one of the slave nodes, and
C=speed of light, and
determines its own position by determining an intersection of the at least two determined TDOAs.

17. The system of claim 10, wherein said receiver is a slave node on the wireless network including at least the first and second transceivers of said first through fourth transceivers, and synchronizes its clock with clocks of at least the first and second transceivers, wherein when a clock offset, $b_e$, for said receiver's clock is known, said processor determines its own position from (i) the known positions of at least the first and second transceivers of said first through fourth transceivers, (ii) reception times of at least the first and second messages of said first through fourth messages at said receiver, (iii) the transmit time of at least the first message, (iv) the receive time of at least the second message, and (v) the clock offset $b_e$.

18. The system of claim 17, wherein said processor determines its own position by solving an intersection of at least one TDOA that is tracked to a predetermined point in time and at least one range that is tracked to the same predetermined point in time, wherein the at least one TDOA is calculated using (i) the known positions of at least the first and second transceivers of said first through fourth transceivers, (ii) reception times of at least the first and second messages of said first through fourth messages at said receiver, (iii) the transmit time of at least the first message, (iv) the receive time of at least the second message; and
the at least one range is calculated using (i) the known positions of at least the first and second transceivers of said first through fourth transceivers, (ii) reception times of at least the first and second messages of said first through fourth messages at said receiver, (iii) the transmit time of at least the first message, (iv) the receive time of at least the second message, and (v) the clock offset $b_e$.

19. The system of claim 18, wherein Kalman filtering tracks the at least one TDOA and the at least one range and the at least one TDOA and the at least one range are interpolated to a predetermined point in time.

20. The system of claim 18, wherein the position determination using the at least one tracked TDOA and the at least one tracked range uses a Maximum Likelihood Estimation approach.

21. The system of claim 11, wherein at least one of said first through fourth transceivers is part of a system on an unmanned aerial vehicle (UAV).

22. The system of claim 11, wherein said receiver is part of a system on an unmanned aerial vehicle (UAV).

* * * * *